United States Patent [19]

Onoue et al.

[11] Patent Number: 5,462,821
[45] Date of Patent: Oct. 31, 1995

[54] GALLIUM BASED ACTIVE MATERIAL FOR THE NEGATIVE ELECTRODE, A NEGATIVE ELECTRODE USING THE SAME, AND BATTERIES USING SAID NEGATIVE ELECTRODE

[75] Inventors: Takashi Onoue; Kiyoshi Araki; Noriya Ishida; Toshiya Kitamura; Yasuhiko Niitsu; Makiko Yanagisawa; Ryo Sakamoto; Fumihiro Sato, all of Tokyo, Japan

[73] Assignee: Dowa Mining Co., Ltd., Tokyo, Japan

[21] Appl. No.: 340,725

[22] Filed: Nov. 16, 1994

[30] Foreign Application Priority Data

| Nov. 19, 1993 | [JP] | Japan | 5-314185 |
| Feb. 18, 1994 | [JP] | Japan | 6-044887 |
| Aug. 10, 1994 | [JP] | Japan | 6-209279 |
| Aug. 25, 1994 | [JP] | Japan | 6-224194 |
| Sep. 3, 1994 | [JP] | Japan | 6-234381 |
| Sep. 13, 1994 | [JP] | Japan | 6-244701 |

[51] Int. Cl.⁶ ............................. H01M 4/58; G01N 27/26
[52] U.S. Cl. .......................... 429/218; 429/233; 429/241; 429/245; 204/293; 204/292
[58] Field of Search ..................... 429/218, 233, 429/241, 245; 204/293, 292

[56] References Cited

U.S. PATENT DOCUMENTS

| 4,104,451 | 8/1978 | Klemann et al. | 429/218 |
| 4,107,406 | 8/1978 | Modeu et al. | 429/218 |
| 4,288,500 | 9/1981 | Jovanovic et al. | 429/218 |
| 4,792,430 | 12/1988 | Horst | 429/218 |
| 4,808,498 | 2/1989 | Tarcy et al. | 429/218 |
| 4,808,499 | 2/1989 | Nagai et al. | 429/218 |
| 5,283,136 | 2/1994 | Peled et al. | 429/218 |
| 5,286,582 | 2/1994 | Takara et al. | 429/218 |

*Primary Examiner*—John Niebling
*Assistant Examiner*—Bruce F. Bell
*Attorney, Agent, or Firm*—Frishauf, Holtz, Goodman, Langer & Chick

[57] ABSTRACT

A novel primary or secondary battery whose active material for the negative electrode is composed of metallic gallium, gallium alloys or gallium oxide has first come into the world.

Gallium has an electrochemical equivalent of 23.24, which is smaller than those of zinc (32.70) and cadmium (56.21). This indicates that when used as an active material for the negative electrode in batteries, gallium has larger capacity per unit mass than zinc and cadmium by respective factors of ca. 1.4 and 2.4. The potential of the reaction; $Ga+6OH^- =GaO_3^{3-}+3H_2O+3e^-$ is obviously less noble than the voltage of hydrogen evolution and this means that a high-potential battery can be made. Due to the high hydrogen overvoltage of gallium, gallium ions in the solution can be precipitated as metallic gallium by electrodeposition. As a further advantage, no dendrite formation occurs during the electrodeposition unlike in the case of zinc. The high hydrogen overvoltage also contributes to the production of a battery that undergoes only limited self-discharge. What is more, gallium which has no toxicity presents few environmental problems.

10 Claims, 14 Drawing Sheets

GALLIUM BASED ACTIVE MATERIAL FOR THE NEGATIVE ELECTRODE, A NEGATIVE ELECTRODE USING THE SAME, AND BATTERIES USING SAID NEGATIVE ELECTRODE

BACKGROUND OF THE INVENTION

This invention relates to a novel active material for the negative electrode that contains a heretofore unavailable metallic element or alloys thereof as a principal component. More specifically, the invention relates to novel primary or secondary battery that is characterized by using as the negative electrode a current collector that is filled or impregnated with an active material that contains metallic gallium or gallium alloys as a principal component.

The use of various active materials, either independently or in combination, for the negative electrode in primary or secondary batteries has been the subject of intensive studies; however, what have been commercialized are limited to lead in lead-acid storage batteries, cadmium in nickel-cadmium rechargeable cells, hydrogen containing alloys in hydrogen batteries, zinc in alkaline cells, lithium in lithium cells and few others.

Because of this limitation on the types of active materials for the negative electrode which determine the basic cell performance, only a few kinds of primary or secondary batteries have been commercialized and their defects cannot be fully cancelled by using them in combination. Under the circumstances, the following problems have arisen.

(1) Dendrites form on the surfaces of electrodes as a result of charge-discharge cycles;
(2) the active materials per se or the materials that precipitate during charge and discharge cycles have such low electric conductivity that large currents are difficult to produce;
(3) the voltage that can be produced is impractically low;
(4) the high chemical activity causes difficulty in handling; and
(5) the toxicity problem.

SUMMARY OF THE INVENTION

As described above, the number of primary or secondary battery types that have been commercialized is too small to cancel their respective defects by combined use. The present invention has been accomplished under these circumstance and has as an object providing a novel active material for the negative electrode that is capable of compensating for the drawbacks of the conventional primary or secondary batteries.

Another object of the invention is to provide a novel negative electrode comprising said novel active material. A further object of the invention is to provide a novel primary or secondary battery that is fabricated by combining said negative electrode with various positive electrodes including a nickel hydroxide electrode, a silver oxide electrode and an air electrode.

With a view to attaining these objects, the present inventors conducted intensive studies and found that when a porous carbon electrode so adapted as to permit electrolyte permeation was impregnated with metallic gallium or a gallium alloy that would turn liquid at room temperature, the gallium would be exposed to an electrolyte at all times and, hence, could be used as an active material for the negative electrode. The present invention has been accomplished on the basis of this finding.

According to its first aspect, the present invention provides an active material for the negative electrode in batteries that contains metallic gallium, a gallium alloy or a gallium compound as a principal component.

According to its second aspect, the invention provides an air-gallium primary battery that uses gallium or a gallium based alloy as an active material for the negative electrode.

According to its third aspect, the invention provides a secondary battery that uses in the negative electrode an active material that contains metallic gallium, a gallium alloy or a gallium compound as a principal component.

According to its fourth aspect, the invention provides a negative electrode for batteries that comprises a metal plate, a metal net or a metal felt as a current collector that has metallic gallium or a gallium alloy sprayed onto the surface in the liquid form at a temperature not lower than the melting point of the metallic gallium or gallium alloy.

According to its fifth aspect, the invention provides a negative electrode for batteries that uses a gallium-based active material and which comprises a membrane shaped from a carbonaceous material that has on the surface a dispersion of a gallium based powder as an active material for the negative electrode.

According to its sixth aspect, the invention provides a negative electrode for batteries that uses a gallium-based active material and which comprises a porous member impregnated with a kneaded blend of an electrically conductive carbonaceous material with gallium oxide or with a combination of gallium oxide and another metal oxide.

According to its seventh aspect, the invention provides a negative electrode for batteries according to the sixth aspect wherein said kneaded blend is shaped into a sheet.

According to its eighth aspect, the invention provides a negative electrode for batteries according to the fifth or the seventh aspect which is compressed on to a metal net to construct an electrode plate.

According to its ninth aspect, the invention provides a secondary battery that uses a gallium based active material for the negative electrode, as well as an alkaline electrolyte having gallium dissolved therein.

DETAILED DESCRIPTION OF THE INVENTION

Figure 1:
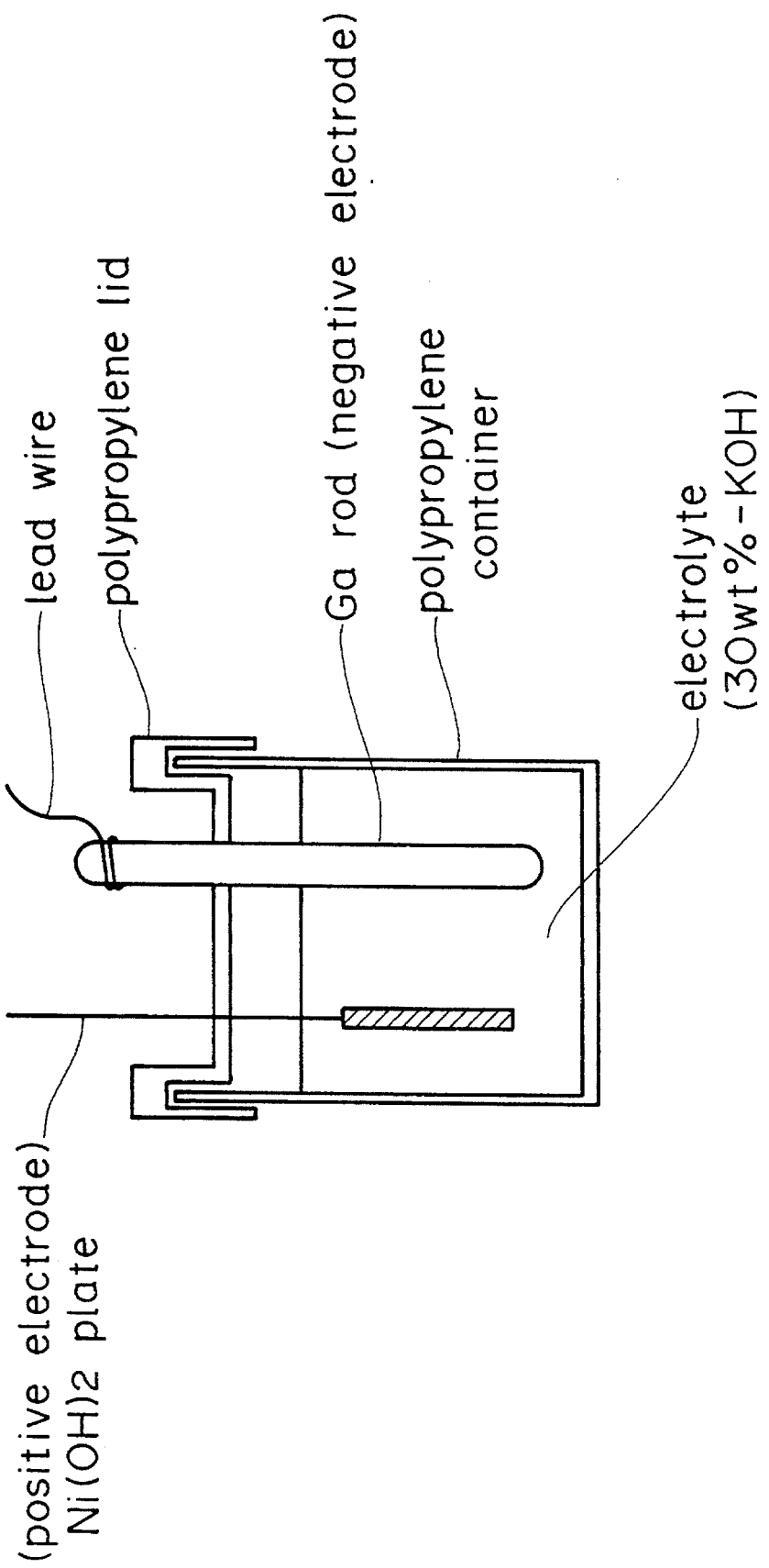
FIG. 1 is a longitudinal section of the Ga—Ni(OH)$_2$ secondary cell constructed in Example 1 of the invention.

Gallium for use in the primary battery of the invention is an immediate neighbor of zinc in the periodic table and has similar chemical properties to zinc. Gallium is an amphoteric element which dissolves in both acids and alkalies. In alkaline aqueous solutions, gallium forms anions such as $GaO_3^-$ and $HGaO_3^{2-}$ or turn to oxides such as $Ga_2O_3$ or hydroxides such as $Ga(OH)_3$ AND $GaOOH$, thus experiencing a change in valence from zero to three. The present inventors assumed that as in the case of zinc, these reactions could be used as electrode reactions whereby gallium could be used as an active material in an air-gallium primary battery. The inventors undertook intensive studies on the basis of this assumption and eventually accomplished the present invention.

One of the important physical properties of gallium is that it is a metal having a low melting point (29.8°). However, the characteristics of a battery that uses gallium are not greatly influenced by whether it is in the liquid or solid state. A further reduction in the melting point can be achieved by alloying gallium with other metals such as In, Zn, Sn, Pb, Bi and Tl in appropriate proportions. Further, unlike mercury which is one of the common active materials, gallium has no toxicity that causes various environmental problems. Having these characteristics, gallium has been verified to be useful as an active material for battery.

In the present invention, gallium may be used either in the elemental form or as alloys. It may also be used as a powder or in the solid form. The present inventors have found that gallium in the powder form is advantageously used as immersed in electrolytes.

The air electrode in the primary battery of the invention is fabricated in the following manner: acetylene black containing platinum as a catalyst is mixed with polytetrafluoroethylene (PTFE) which serves as a binder or a water repellent and the powder of the mixture is rolled to form a sheet of a suitable thickness, which is then compressed on to a nickel screen as a current collector.

In producing the secondary battery of the invention, the present inventors utilized the phenominon that gallium would dissolve in an highly alkaline aqueous solution according to the following scheme (1) for oxidation-reduction reaction (see M. Pourbaix, Atlas of Electrochemical Equilibria in Aqueous Solutions, Pergamon Press):

$$Ga+6OH^-=GaO_3^{3-}+3H_2O+3e^- \quad (1)$$

$$(E_0=0.319-0.1182pH+0.0197\log[GaO_3^{3-}])$$

Even when gallium oxide is substituted for metallic gallium as the active material for the negative electrode in batteries or even if part of the metallic gallium precipitates as gallium oxide during the electrode reaction, it will dissolve in the alkaline electrolyte according to the scheme (2) or a charging reaction occurs according to the scheme (3), whereby the gallium oxide is reduced to metallic gallium:

$$Ga_2O_3+6OH^-=2GaO_3^{3-}+3H_2O \quad (2)$$

$$Ga_2O_3+3H_2O+6e^-=2Ga+6OH^- \quad (3)$$

Thus, gallium oxide turns to GaO and Ga according to schemes (2) and (3), respectively, and in either way it will participate in the electrode reaction according to scheme (1). As one can see from eq. (1), gallium dissolves in the electrolyte by experiencing the change in valance from zero to three. Gallium has an electrochemical equivalent of 23.24, which is smaller than those of zinc (32.70) and cadmium (56.21). This indicates that when used as an active material for the negative electrode in batteries, gallium has larger capacity per unit mass than zinc and cadmium by respective factors of ca. 1.4 and 2.4. The potential of the reaction (1) is obviously less noble than the voltage of hydrogen evolution and this means that a high-potential battery can be made. Due to the high hydrogen overvoltage of gallium, gallium ions in the solution can be precipitated as metallic gallium by electrodeposition. As a further advantage, no dendrite formation occurs during the electrodeposition unlike in the case of zinc. The high hydrogen overvoltage also contributes to the production of a battery that undergoes only limited self-discharge. What is more, gallium which has no toxicity presents few environmental problems.

In summary, gallium has very advantageous characteristics for use as a negative electrode material in batteries, as exemplified by high capacity, high energy density, limited self-discharge and environment friendliness.

Figure 4:
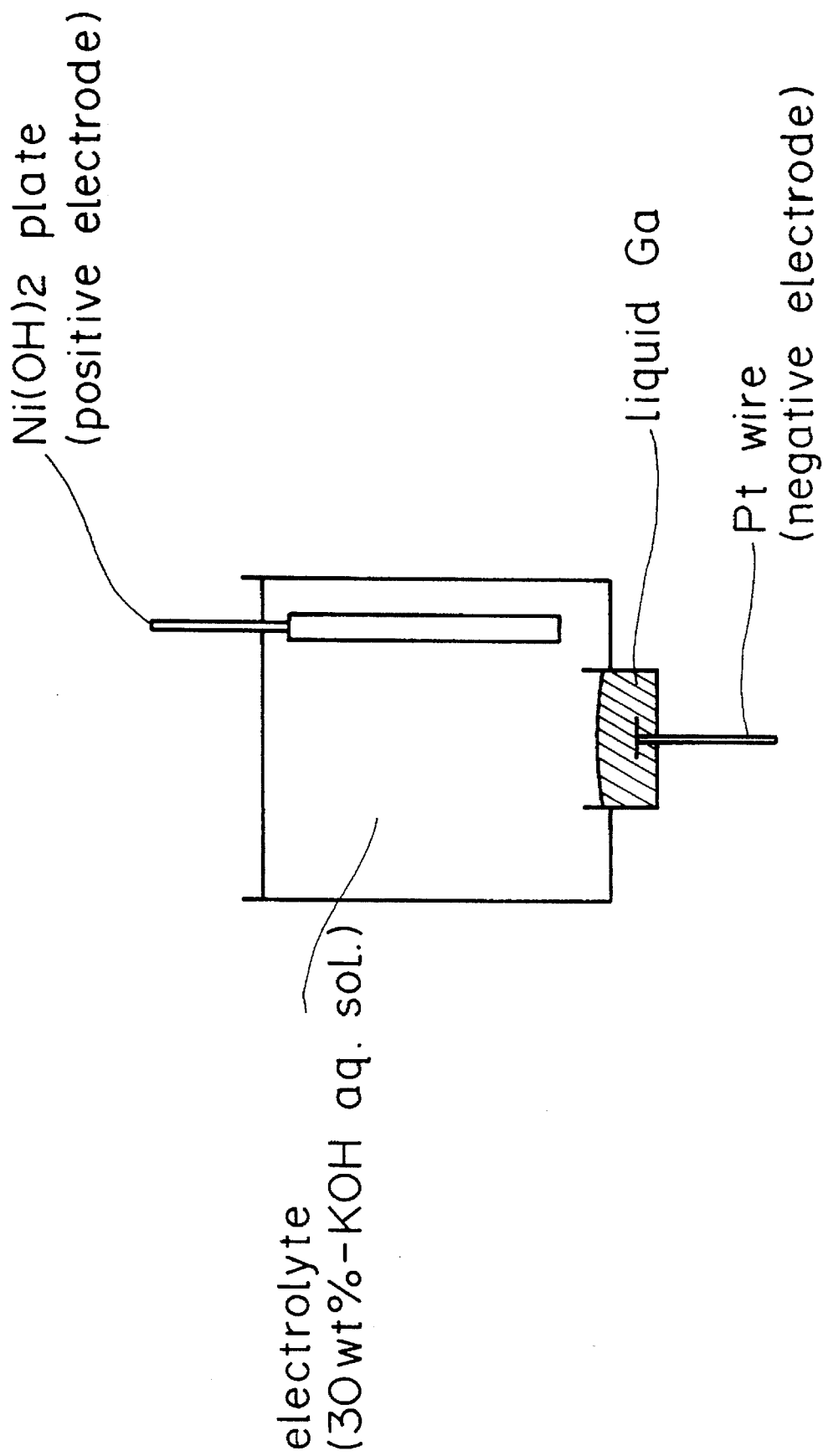
FIG. 4 is a longitudinal section of the Ga—Ni(OH)$_2$ secondary cell constructed in Example 3 of the invention.

The negative electrode of the invention uses the active material such as metallic gallium, gallium alloys and gallium oxide and it may be shaped in various forms such as a metallic gallium rod (see FIG. 1) and a porous member that is impregntated with liquid gallium or a liquid gallium alloy in either the interior or the bottom (see FIG. 4).

Other applicable forms of the negative electrode include a membrane of an electrically conductive carbonaceous material over which a powder of the active material containing gallium as a principal component is dispersed, the membrane that is rolled into a sheet after the treatment with the powder dispersion, and the membrane that is compressed on to a metal net after the treatment with the powder dispersion If gallium oxide is to be used as an active material for the negative electrode, it may be blended and kneaded with a small amount of an electrically conductive material such as carbon black and impregnated in a porous member.

The present inventors found in later studies that the use of gallium dissolved in an alkaline electrolyte enabled the adoption of inexpensive copper, iron, bismuth and stainless steel plates or screens as negative plates.

It was also found that when those negative plates (i.e., Cu, Fe, Bi and stainless steel plates) were gun-sprayed with liquid gallium or a gallium alloy, a suitable amount of gallium could be dispersed to bind to the surface of each negative plate and the thus fabricated negative electrodes proved to be as effective as in the case Just described above.

The following examples are provided for the purpose of further illustrating the present invention but are in no way to be taken as limiting.

EXAMPLE 1

Figure 2:
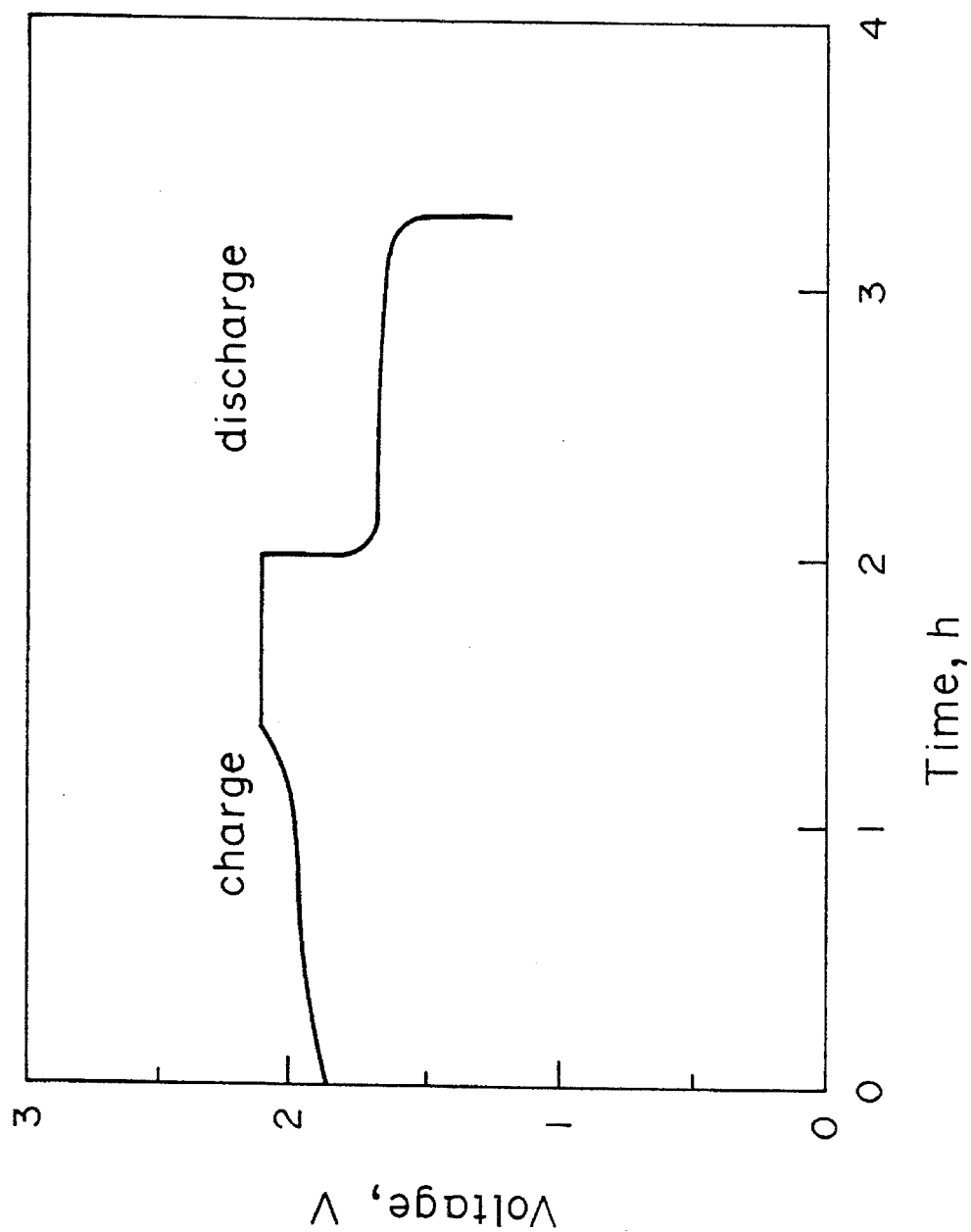
FIG. 2 is a graph showing the characteristic curve for the cell at the 250th cycle.
Figure 3:
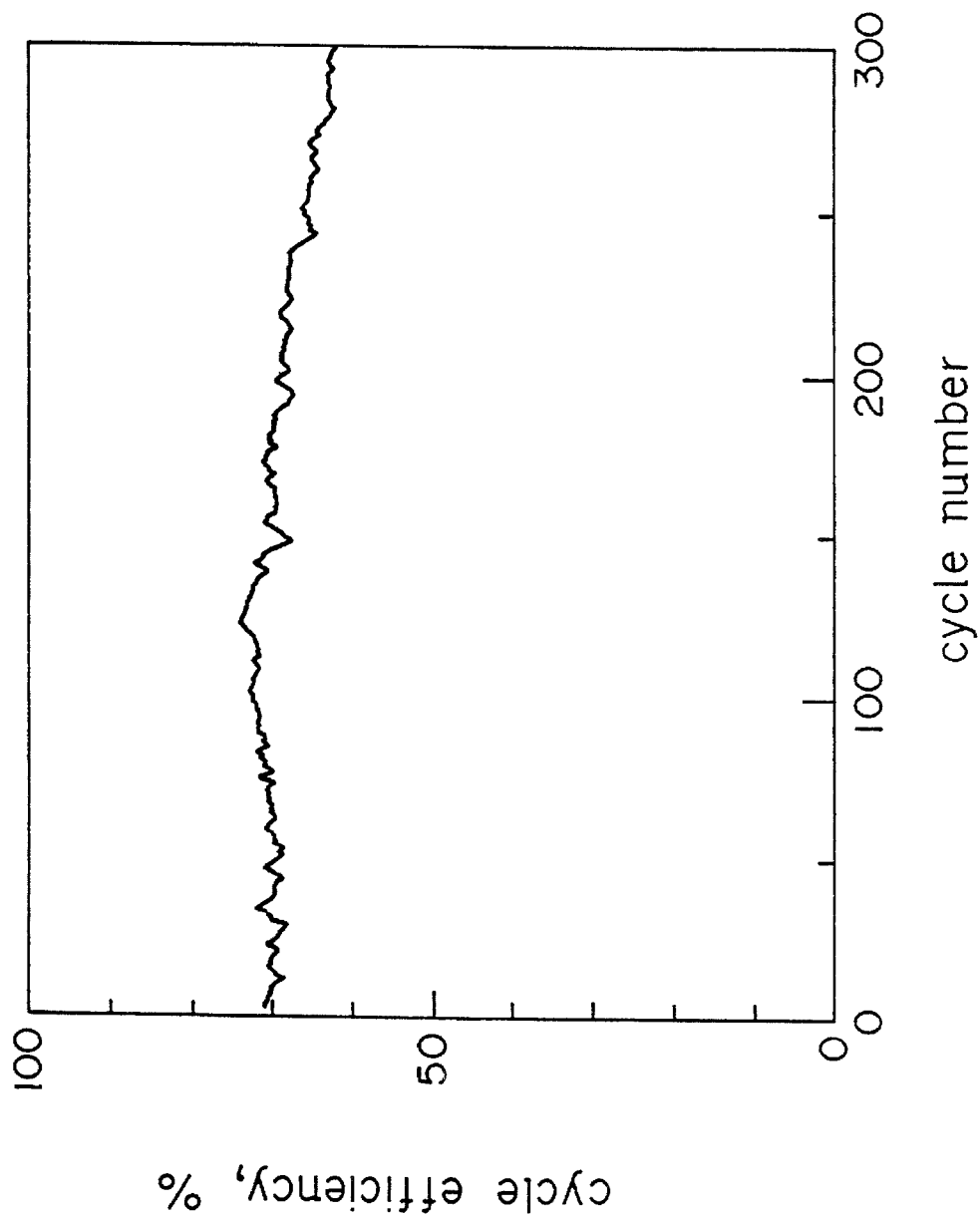
FIG. 3 is a graph showing the cycle efficiency of the cell as a function of cycle number.

A cell of the type shown in FIG. 1 was constructed using a gallium rod as the negative electrode, a nickel hydroxide plate as the positive electrode, and 30% (m/m) KOH as the electrolyte. The cell was subjected to a cycle test. Since the gallium in the negative electrode was in excess over the nickel hydroxide in the positive electrode (the capacity of Ga was about 25 times as large as $Ni(OH)_2$), the charge and discharge cycles were controlled with the positive electrode. The cycle test was conducted at 20° C. at which gallium would not melt. The charge and discharge currents were each 100 mA and charging was continued until the positive electrode was overcharged. The cut-off voltage was 1.2 volts. The characteristic curve for the 250th cycle is shown in FIG. 2, and the cycle efficiency (values including the efficiency at positive electrode overcharging) as a function of cycle number is shown in FIG. 3. From FIGS. 2 and 3, one can verify that the cell of Example 1 functioned as a secondary cell that was rechargeable at high potential (discharge voltage of 1.6–1.9 volts) and that had a satisfactory cycle life.

EXAMPLE 2

A cell of the type shown in FIG. 1 was constructed using a gallium rod as the negative electrode, a silver oxide ($Ag_2O$) plate as the positive electrode, and 30% (m/m) KOH as the electrolyte. The positive electrode was fabricated in the following manner: 85% (m/m) of battery-grade $Ag_2O$ (product of Dowa Mining Co., Ltd.) was mixed with 10% (m/m) of KETJENBLACK (the trade name of Lion Corp. for carbon black) and 5% (m/m) of PTFE and the mixture was rolled to a sheet of a suitable thickness, which was compressed on to a Ni screen as a current collector. The cell thus constructed was subjected to a cycle test under the same conditions as in Example 1; it was verified to be a feasible secondary cell.

EXAMPLE 3

Figure 5:
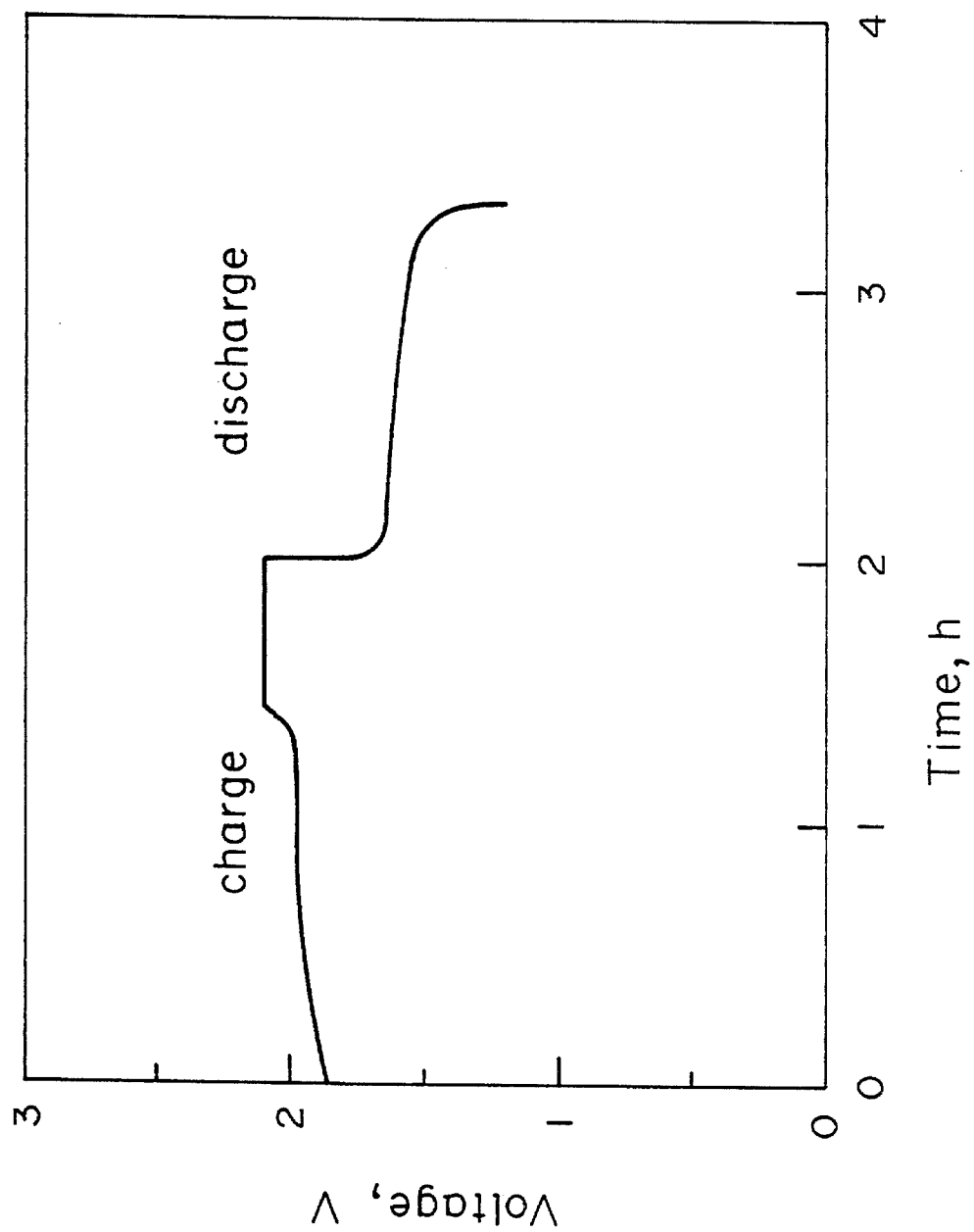
FIG. 5 is a graph showing the characteristic curve for the cell at 250th cycle.
Figure 6:
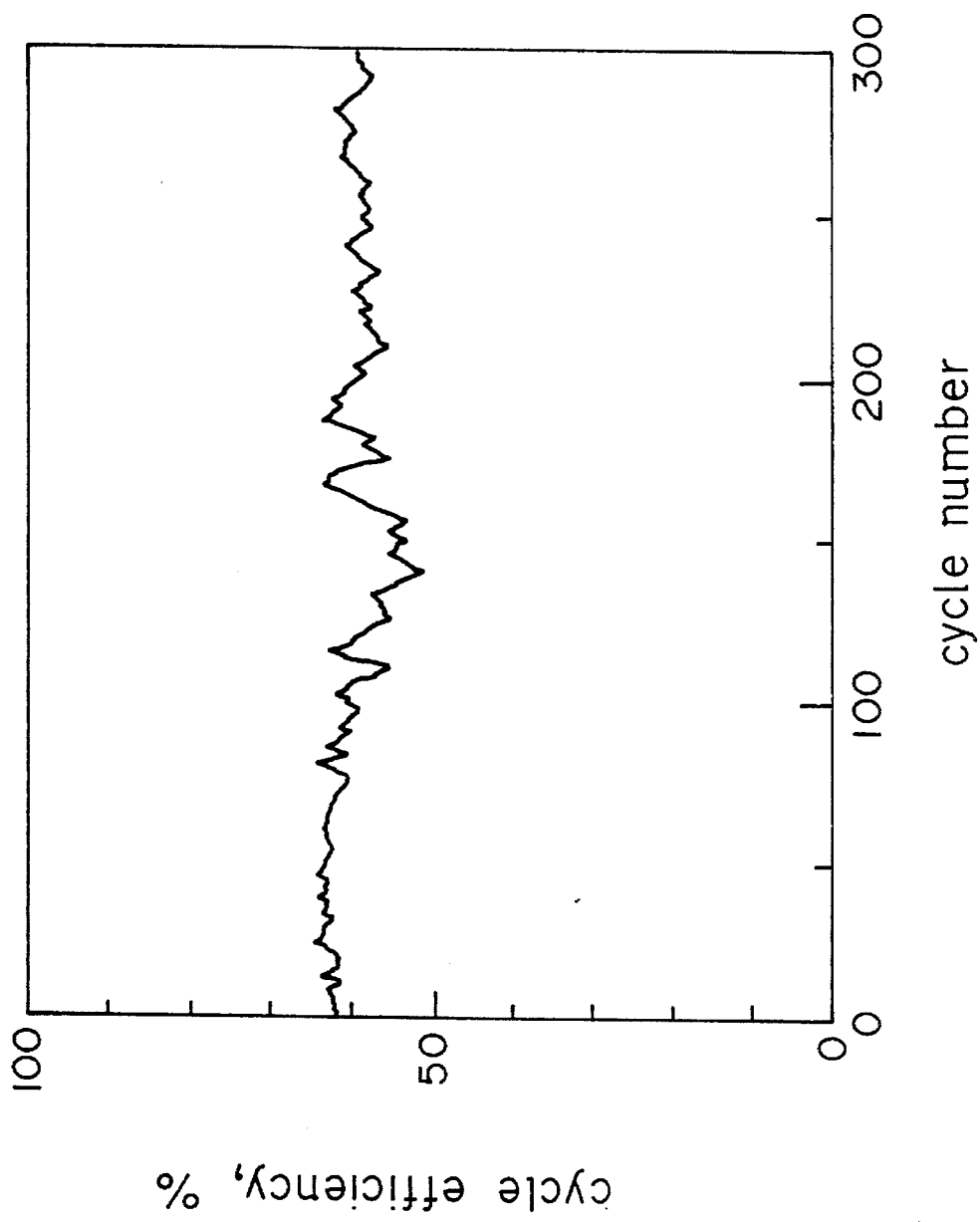
FIG. 6 is a graph showing the cycle efficiency of the cell as a function of cycle number.

A cell of the type shown in FIG. 4 was constructed using liquid gallium as the negative electrode material, a nickel hydroxide plate as the positive electrode and 30% (m/m) KOH as the electrolyte. The cell was subjected to a cycle test which was conducted at 40° C. at which gallium would melt. The other test conditions were the same as in Example 1. The characteristic curve for the 250th cycle is shown in FIG. 5, and the cycle efficiency (values including the efficiency at positive electrode overcharging) as a function of cycle number is shown in FIG. 6. The cell exhibited basically the same characteristics as the cell of Example 1 which used solid-state gallium as the negative electrode material.

The results of Examples 1–3 demonstrate that the cell characteristics are not influenced by whether gallium is in the liquid or solid state.

EXAMPLE 4

Gallium alloys with In, Zn, Sn, Bi, Cd and Pb were used as active materials for the negative electrode. The general tendency of gallium is that the melting point of its alloys decreases with the increasing Ga content. Using the gallium alloys listed above, cells of the same type as used in Example 3 were evaluated for their characteristics under the same conditions as in Example 3. The alloying proportions were referenced to the composition near the eutectic point of eutecitc alloys (Ga-In, Ga-Zn and Ga-Sn). In the case of non-eutectic alloys (Ga-Bi, Ga-Cd and Ga-Pb), tests were conducted on Ga alloys with 2% (m/m) Bi, 4% (m/m) Cd and 8% (m/m) Pb. Except for Pb, all alloy systems tested had a tendency to provide improved flatness in the discharge potential.

EXAMPLE 5

Cells were constructed using an electrolyte that had 25% (m/m) Ga dissolved in 30% (m/m) KOH. The negative plate was a copper, iron, bismuth or stainless steel plate or screen, and the positive electrode was a nickel hydroxide plate. The cells thus constructed were subjected to a cycle test. During the charging, a precipitation reaction proceeded according to the scheme (1) and gallium precipitated on the negative plate. The efficiency of electrodeposition was found to be at least 98% when tested over the negative plate current density range of 0–350 $mA/cm^2$. After charging, the cells were subjected to a cycle test under the same conditions as in Example 1 and they were found to have the same cell characteristics and cycle life as the cell of Example 1.

EXAMPLE 6

Negative plates (Cu, Fe, Bi and stainless steel plates) were gun-sprayed with liquid gallium or a liquid gallium alloy so that a suitable amount of Ga would be dispersed to bind to the surface of each negative plate. The plates with gallium binding in that way were used as the negative electrode to construct cells. The cells were subjected to a cycle test under the same conditions as in Example 1, showing substantially the same cell characteristics and cycle life as the cell of Example 1.

EXAMPLE 7

Gallium oxide (product of Dowa Mining Co., Ltd. with 99.99% purity) was rendered to be electrically conductive by mixing and kneading with a small amount of KETJENBLACK (the trade name of Lion Corp. for carbon black). The blend was impregnated in a porous member having such a porosity that liquid gallium would not exude to the surface but that the electrolyte would permeate. The thus impregnated porous member was used as a negative electrode. The porous member used as the basis of the negative electrode was either (1) a cylindrical separator or (2) a cylindrical porous carbon rod. The current collector for the negative electrode was a fine stainless steel wire; the electrolyte was an aqueous solution of 30% (m/m) KOH; and the positive electrode was comprised of nickel hydroxide.

Using these components and materials, simple cells were constructed and subjected to a cycle test. During the first charge, part of the gallium oxide as the active material for the negative electrode turned to metallic gallium according to the reaction scheme (3). The gallium thus formed dissolved into the electrolyte during discharge. During recharge, the remaining gallium oxide was reduced to metallic gallium according to the reaction scheme (3) or the gallium ions in the electrolyte were electrodeposited to bring the cell to the recharged state. These charge and discharge reactions verified that the cells of Example 7 functioned properly as secondary cells.

EXAMPLE 8

Gallium oxide (product of Dowa Mining Co., Ltd. with 99.99% purity) was rendered to be electrically conductive by mixing and kneading with a small amount of metallic gallium powder and the blend was packed into the interior of a porous member of the same type as used in Example 7, thereby fabriciating a negative electrode. The current collector or the negative electrode was fine stainless steel wire; the electrolyte was an aqueous solution of 30% (m/m) KOH; and the positive electrode was comprised of nickel hydroxide. Compared to the use of KETJENBLACK with a very small density in Example 7, the metallic gallium which was used as an agent to impart electrical conductivity in Example 8 contributed to a drop in the volume of the active material for the negative electrode, whereby the cell capacity per unit volume was increased.

Example 9

Ten grams of the powder mixture of gallium oxide and metallic gallium which was used in Example 8 were mixed and kneaded with 1–3 ml of a PTFE solution in the presence of a suitable amount of ethanol. Thereafter, the blend, while it was partially dry, was spread to thicknesses of 0.1–2 mm, thereby making sheet electrodes. The thus made $Ga_2O_3/Ga$ sheet electrodes were compressed on to Ni, Cu, Fe and other nets at pressures of 100–400 kgf/cm$^2$, thereby fabricating electrodes. Cells were constructed using these electrodes as negative electrodes and subjected to a cycle test under the same conditions as in Example 1. They exhibited substantially the same cell characteristics and cycle life as the cell of Example 1. It should also be noted that the performance of the ells of Example 9 was independent of the temperature at which gallium melted or solidified and that they could function as secondary cells that could be charged and discharged at either temperature.

EXAMPLE 10

A carbonaceous material that was highly conductive and which was hard to react with gallium was used as a basis into which the fine particles of metallic gallium and a gallium alloy as active materials for the negative electrode were dispersed so that they would be supported on the carbonaceous material. The mixture thus prepared was rolled into a sheet electrode. The fabrication of the sheet electrode has the advantage of not only preventing the agglomeration of the particles of liquefied Ga but also increasing the area for chemical reactions as well as forming a current collector of the Ga supporting carbon electrode per se. An exemplary process for the fabrication of the Ga supporting carbon electrode proceeds as follows: to 30–90% (m/m) of particulate ($\leq$ 150 μm) $Ga_2O_3$ (product of Dowa Mining Co., Ltd.), 10–70% (m/m) of a carbonaceous material such as KETJENBLACK (the trade name of Lion Corp. for carbon black) or acetylene black or graphite powder is added and the mixture is kneaded in the presence of a suitable amount of ethanol. The resulting powder is dried with a dryer and reduced at a temperature not lower than 600° C. in a reducing atmosphere (e.g. $H_2O/H_2$ steam, $CO_2/CO$ steam, Ar stream or C powder) of such a nature as to convert $Ga_2O_3$ to Ga. As a result of this procedure, the following reactions will proceed to have the liquid Ga dispersed in the carbonaceous material:

$$Ga_2O_3 + 3H_2 = 2Ga + 3H_2O \tag{2}$$

$$Ga_2O_3 + 3CO = 2Ga + CO_2 \tag{3}$$

$$2Ga_2O_3 + 3C = 4Ga + 3CO_2 \tag{4}$$

The reduced powder was ground gently and after adding 1–3 ml of a PTFE solution to 10 g of the resulting particles, the mixture was kneaded in the presence of a suitable amount of ethanol. The particles were then compacted to a suitable size, dried and rolled to a thickness of 0.1–1 mm on a mill.

Figure 7:
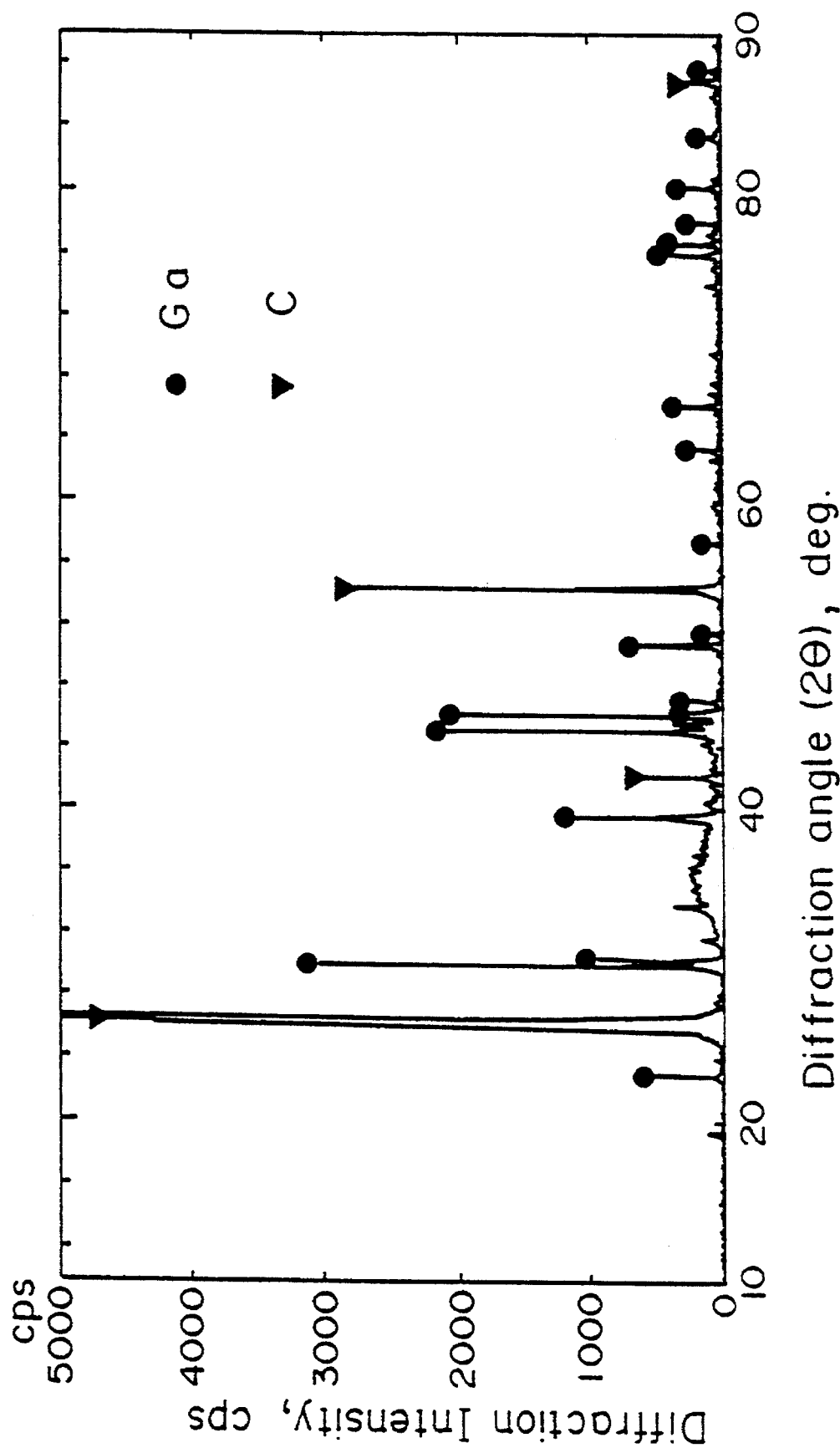
FIG. 7 is an optical microgram showing the surface of the sheet electrode prepared in Example 10.
Figure 8:
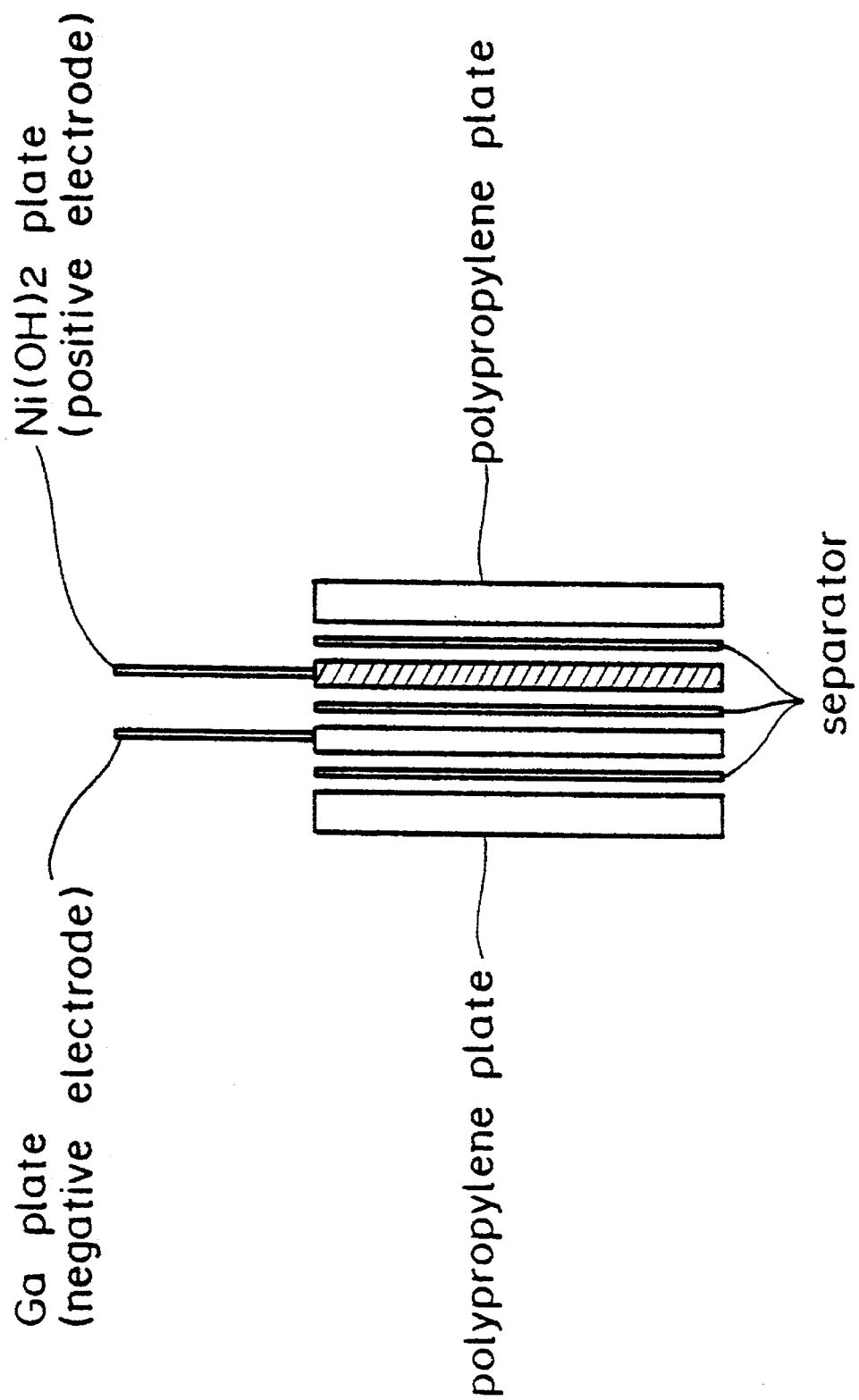
FIG. 8 is a scan of the same sheet electrode analyzed by powder X-ray diffraction.

The sheet thus prepared was examined for the surface under an optical microscope and subjected to analysis by powder X-ray diffraction. The results are shown in FIG. 7 and 8, from which one could verify that Ga was dispersed in the carbonaceous material and that $Ga_2O_3$ had turned to Ga. The Ga supporting carbon electrode was compressed on to Ni, Cu and other nets at pressures of 100–400 kgf/cm$^2$, thereby fabricating electrodes.

Figure 9:
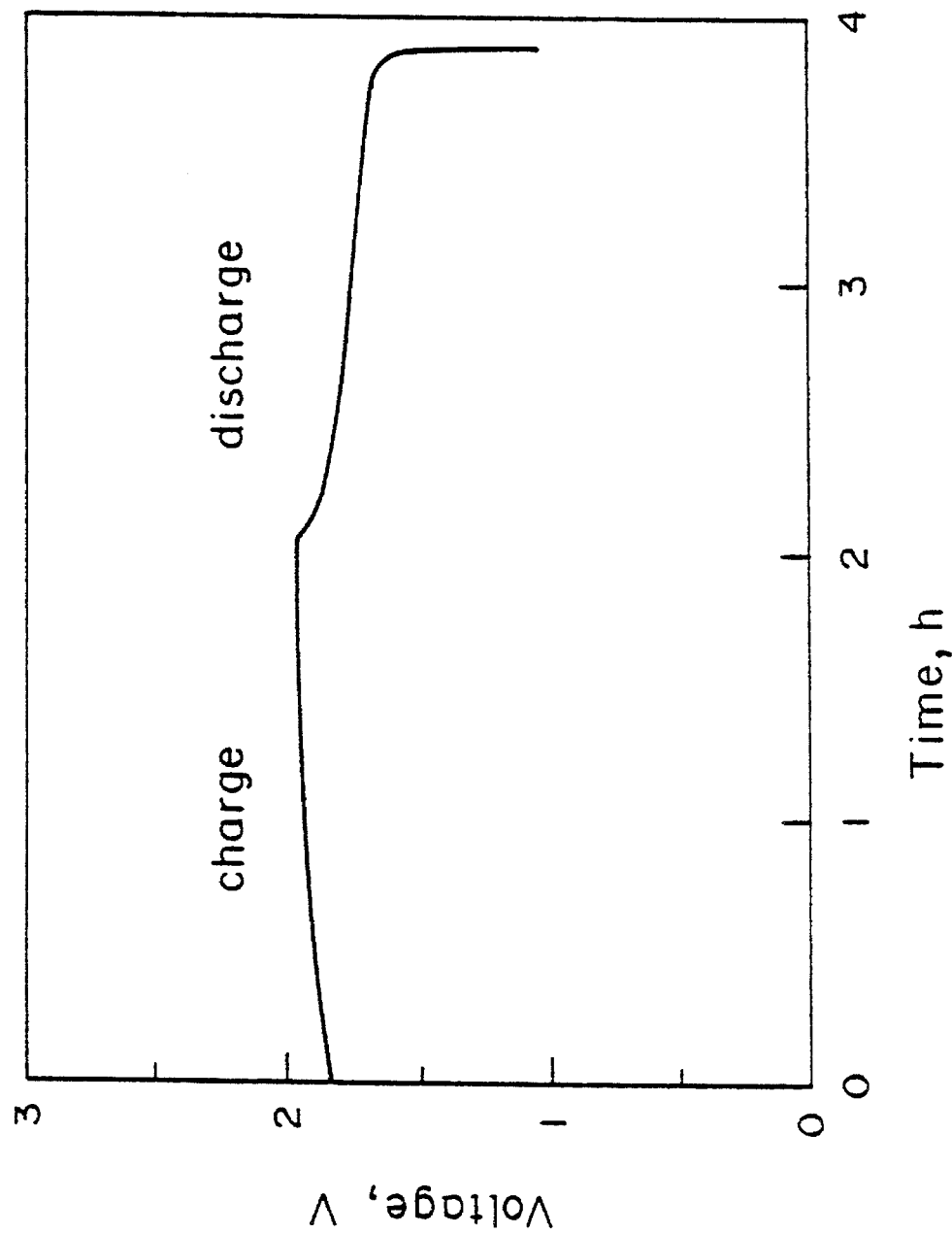
FIG. 9 is a longitudinal section of the secondary cell constructed in Example 10.
Figure 10:
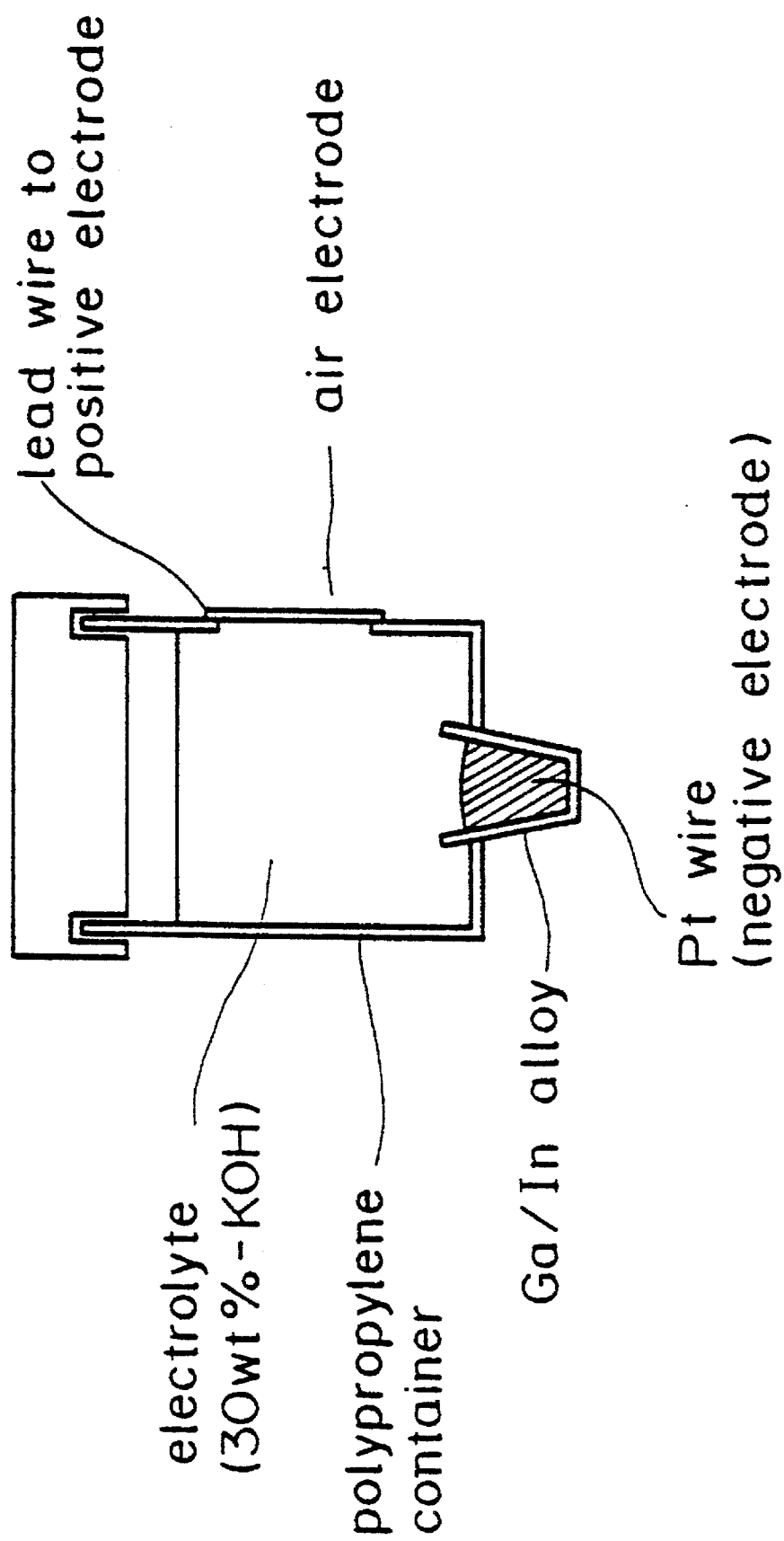
FIG. 10 is a graph showing the results of the cycle test performed on the cell.

The electrodes were used as negative electrodes to construct cells of the type shown in FIG. 9. The cells were subjected to a cycle test at current values of ±5 mA. The test results are shown in FIG. 10. The use of the negative electrodes having large surface areas of chemical reactions, as combined with the design of FIG. 9 featureing a short inter-electrode distance, contributed to the production of cells that produced high potentials (1.9-1.7 volts) with small IR drop.

EXAMPLE 11

Figure 11:
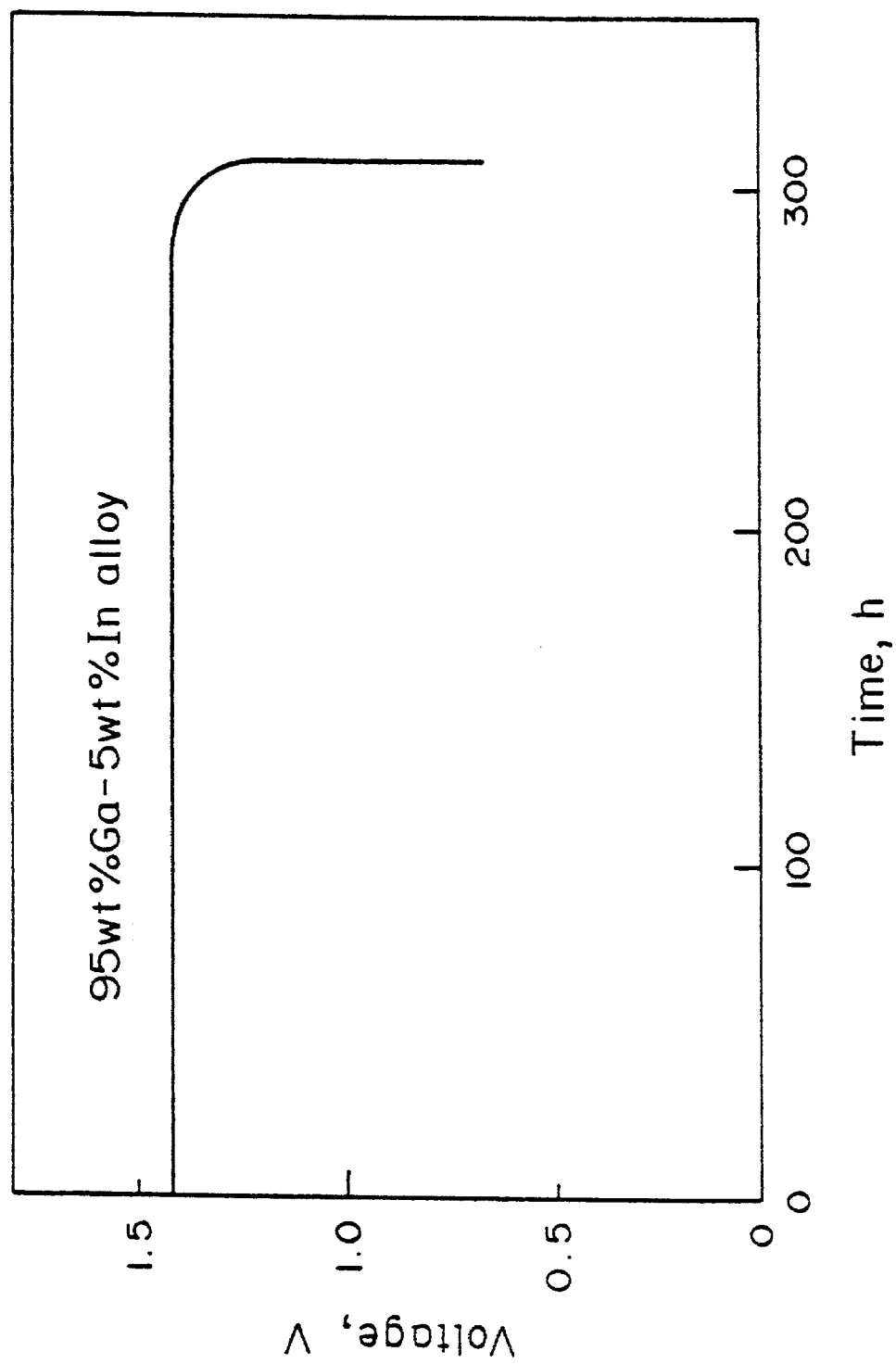
FIG. 11 is a longitudinal section of the Ga-air primary cell constructed in Example 11.
Figure 12:
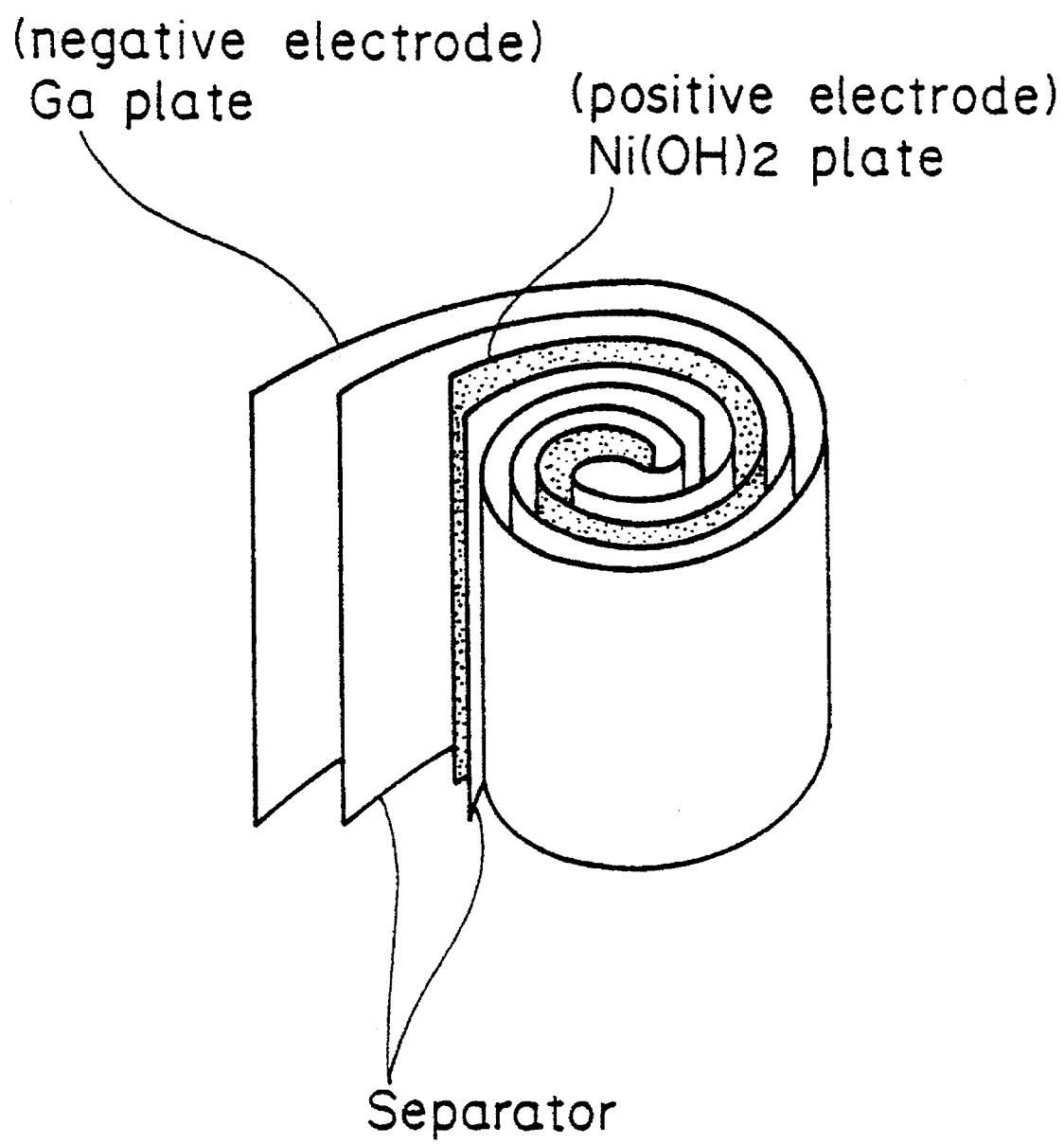
FIG. 12 is a graph showing the results of the cycle test performed on the primary cell.

Since gallium has a low electrochemical equivalent (23.24), the theoretical cell capacity can be increased by using it as an active material for the negative electrode. This approach is particularly effective in the production of an air cell whose capacity is directly determined by the capacity of the active material for the negative electrode. Based on this understanding, the inventors fabricated a Ga-air primary cell of the structure shown in FIG. 11 and conducted a test to investigate their discharge characteristics. In the test, a 95% Ga-5% In (m/m) alloy which was liquid at 25° C. was used as an active material for the negative electrode. The test results are shown in FIG. 12. During the discharge at 5 mA, the cell exhibited a very flat profile at a discharge voltage of 1.43 volts. Gallium as the active material for the negative electrode was liquid at the measurement temperature 40° C. It should be mentioned that the cell exhibited substantially the same profile during a discharge test that was conducted at a measurement temperature of 20° C. at which gallium remained solid.

EXAMPLE 12

Figure 13:
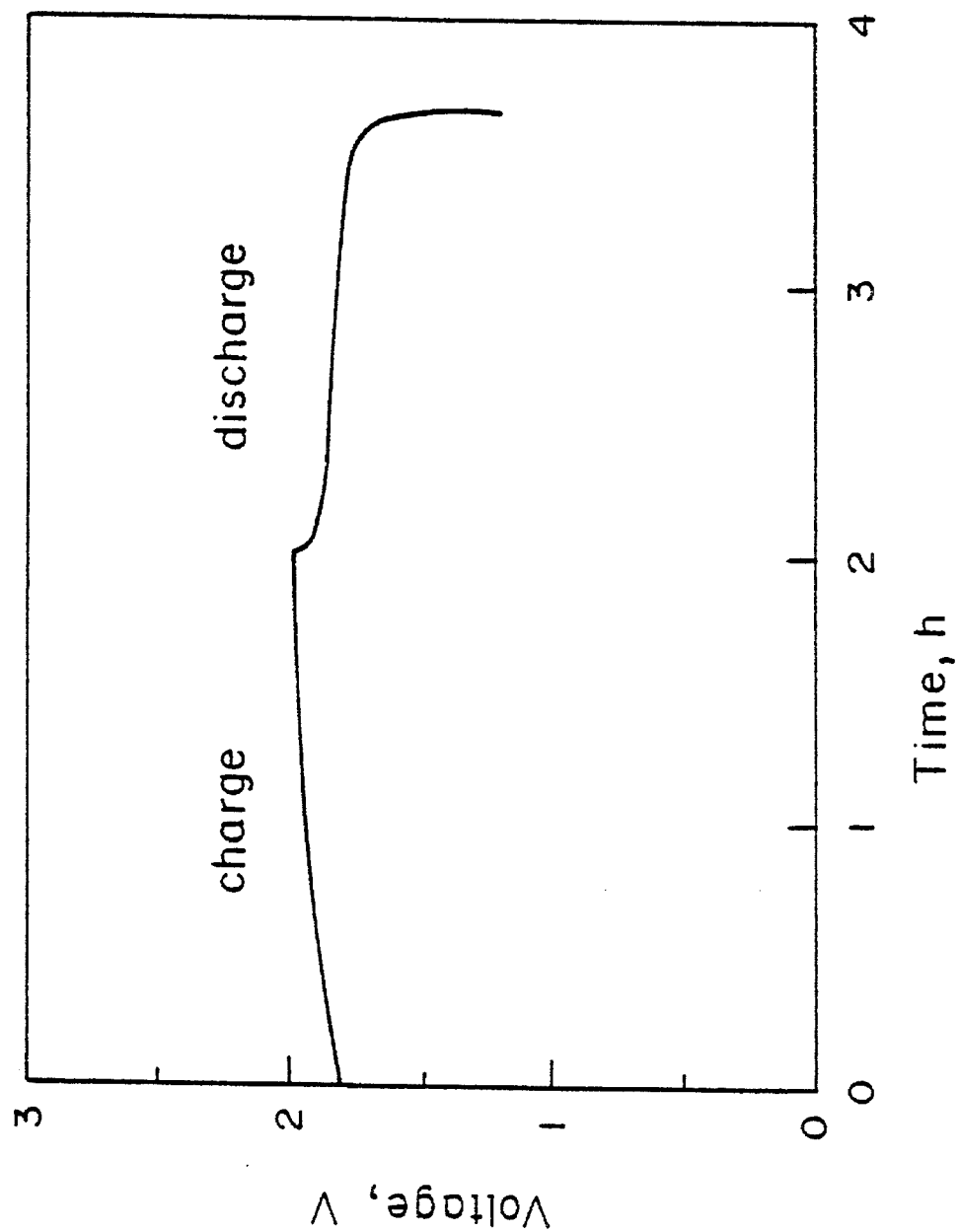
FIG. 13 is a longitudinal section of the secondary cell of a spiral structure that was constructed in Example 12.

A cell of the spiral design shown in FIG. 13 was constructed using a negative plate of the same type as prepared in Example 6. The positive plate was a nickel hydroxide plate of the same length as the negative plate and a separator was placed between the negative and positive plates to prevent shorts. An assembly consisting of the negative plate, the separator and the positive plate in that order was rolled about itself in 2–4 turns so that the negative plate would face outward. The roll was placed in a nickel container. The electrolyte was an aqueous solution of 30% (m/m) KOH.

Figure 14:
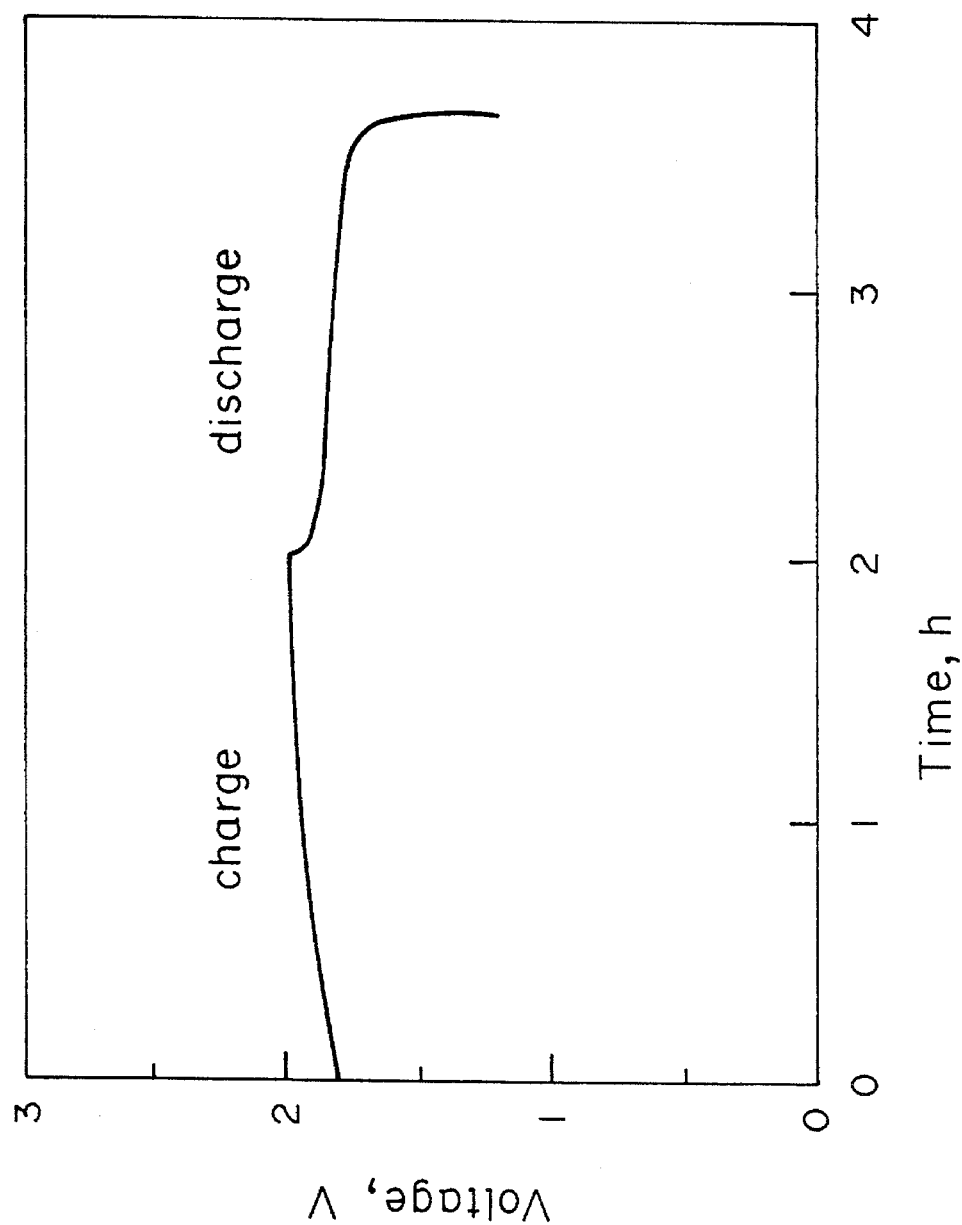
FIG. 14 is a graph showing the results of the cycle test conducted on the cell.

The cell was subjected to a cycle test under the same conditions as in Example 1 and the results are shown in FIG. 14. Because of the spiral design, the interelectrode distance of the cell was short enough to reduce its internal resistance. As a result the IR drop during discharge decreased so much that the cell exhibited an average discharge voltage of 1.82 volts which was close to the theoretical value for the cell.

What is claimed is:

1. An active material for the negative electrode in batteries that contains metallic gallium, a gallium alloy or a gallium compound as a principal component.

2. An air-gallium primary battery that uses gallium or a gallium-based alloy as an active material for the negative electrode.

3. A secondary battery that uses in the negative electrode an active material that contains metallic gallium, a gallium alloy or a gallium compound as a principal component.

4. A negative electrode for batteries that comprises a metal plate, a metal net or a metal felt as a current collector that has metallic gallium or a gallium alloy sprayed onto the surface in the liquid form at a temperature not lower than the melting point of the metallic gallium or gallium alloy.

5. A negative electrode for batteries that uses a gallium-based active material and which comprises a membrane shaped from a carbonaceous material that has on the surface a dispersion of a gallium based powder as an active material for the negative electrode.

6. A negative electrode for batteries according to claim 5 which is compressed on to a metal net to construct an electrode plate.

7. A negative electrode for batteries that uses a gallium-based active material and which comprises a porous member impregnated with a kneaded blend of an electrically conductive carbonaceous material with gallium oxide or with a combination of gallium oxide and another metal oxide.

8. A negative electrode for batteries according to claim 7 wherein said kneaded blend is shaped into a sheet.

9. A negative electrode for batteries according to claim 8 which is compressed on to a metal net to construct an electrode plate.

10. A secondary battery that uses a gallium based active material for the negative electrode, as well as an alkaline electrolyte having gallium dissolved therein.

* * * * *